United States Patent
van Doorn et al.

(10) Patent No.: US 8,456,304 B2
(45) Date of Patent: Jun. 4, 2013

(54) PERIMETER SECURITY SYSTEM

(75) Inventors: Eric van Doorn, Frederick, MD (US); Sendil Rangaswamy, Gaithersburg, MD (US)

(73) Assignee: Intelligent Automation, Inc., Rockville, MD (US)

( * ) Notice: Subject to any disclaimer, the term of this patent is extended or adjusted under 35 U.S.C. 154(b) by 0 days.

(21) Appl. No.: 13/563,134

(22) Filed: Jul. 31, 2012

(65) Prior Publication Data
US 2012/0319844 A1    Dec. 20, 2012

Related U.S. Application Data

(63) Continuation-in-part of application No. 12/971,582, filed on Dec. 17, 2010, now Pat. No. 8,232,878, and a continuation of application No. 11/485,190, filed on Jul. 12, 2006, now abandoned.

(51) Int. Cl.
*G08B 13/00* (2006.01)

(52) U.S. Cl.
USPC ............ 340/541; 340/552; 340/561; 340/565

(58) Field of Classification Search
USPC .......................................................... 340/541
See application file for complete search history.

(56) References Cited

U.S. PATENT DOCUMENTS

| | | | |
|---|---|---|---|
| 3,562,749 A | 2/1971 | Uchimoto et al. | |
| 3,877,002 A | 4/1975 | Cheal et al. | |
| 4,213,122 A | 7/1980 | Rotman et al. | |
| 4,224,607 A | 9/1980 | Poirier et al. | |
| 5,555,446 A | 9/1996 | Jasinski | |
| 5,578,988 A * | 11/1996 | Hoseit et al. | 340/522 |
| 6,288,640 B1 * | 9/2001 | Gagnon | 340/539.17 |
| 6,424,259 B1 | 7/2002 | Gagnon | |
| 6,614,384 B2 * | 9/2003 | Hall et al. | 342/28 |
| 6,762,686 B1 * | 7/2004 | Tabe | 340/573.1 |
| 6,822,604 B2 | 11/2004 | Hall et al. | |
| 6,906,625 B1 | 6/2005 | Taylor et al. | |
| 7,020,701 B1 | 3/2006 | Gelvin et al. | |
| 7,295,109 B2 * | 11/2007 | Kobayashi | 340/541 |
| 2004/0080415 A1 | 4/2004 | Sorensen | |
| 2005/0055568 A1 * | 3/2005 | Agrawala et al. | 713/200 |
| 2005/0083199 A1 | 4/2005 | Hall et al. | |
| 2006/0017566 A1 * | 1/2006 | Gauvreau et al. | 340/541 |
| 2006/0132301 A1 | 6/2006 | Stilp | |
| 2006/0164240 A1 | 7/2006 | Patchell | |
| 2006/0229086 A1 | 10/2006 | Broad et al. | |
| 2009/0303042 A1 * | 12/2009 | Song et al. | 340/566 |

* cited by examiner

*Primary Examiner* — Kerri McNally
(74) *Attorney, Agent, or Firm* — Faegre Baker Daniels LLP

(57) ABSTRACT

A security system for detecting physical intrusion in a monitored area including a plurality of radio units arranged in a network around the monitored area to determine received signal strength and pass variations thereof through the radio units to a base station.

15 Claims, 6 Drawing Sheets

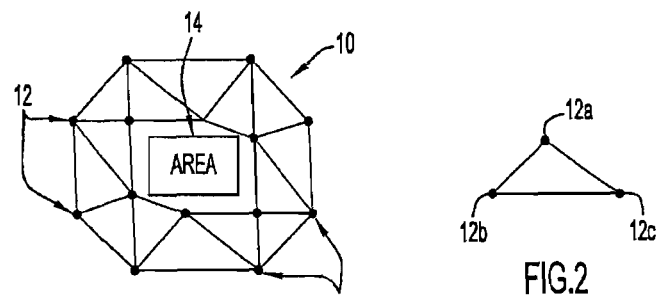
FIG.1
FIG.2
FIG.3
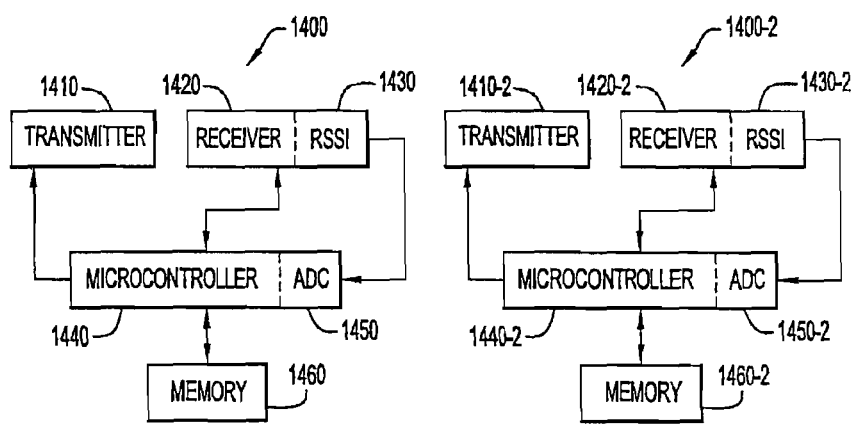
FIG.4
FIG.5

PERIMETER SECURITY SYSTEM

The subject application is a Continuation-In-Part of U.S. patent application Ser. No. 11/485,190 filed Jul. 12, 2006 and Continuation of U.S. patent application Ser. No. 12/971,582 filed Dec. 17, 2010 (now U.S. Pat. No. 8,232,878), the entire disclosures of which are incorporated herein by reference.

BACKGROUND OF THE INVENTION

1. Field of the Invention

The present invention relates to wireless security systems and, more particularly, to wireless security systems for detecting physical intrusions or movements in a monitored area or perimeter and reporting any intrusions and/or movements.

2. Description of the Prior Art

There is a great need for wireless security systems to detect physical intrusions into monitored areas by human or other intruders and report the intrusion and its nature. In the past, wireless security or intruder detection systems have had the disadvantages of being complicated with respect to tracking an intrusion, of providing inaccurate readings in the presence of noise or interference and of utilizing expensive equipment not easily arranged to form a perimeter around an area to be monitored. U.S. Pat. No. 4,213,122 to Rotman et al., U.S. Pat. No. 4,224,607 to Poirier et al., U.S. Pat. No. 6,424,259 to Gagnon, U.S. Pat. No. 6,614,384 to Hall et al., and U.S. Pat. No. 6,822,604 to Hall et al. and U.S. Published Patent Applications No. 2004/0080415 to Sorensen, No. 2005/0055568 to Agrawala et al., and No. 2005/0083199 to Hall et al. are representative of efforts to provide such wireless security systems.

SUMMARY OF THE INVENTION

One aspect of the present invention is to provide a multi-purpose security system utilizing narrow-band, low-data rate, low power (approximately 10 megawatts) radio units in a frequency range between 800 MHz and several GHz. The radio units are arranged in a network with each radio unit having a signal transmitter, a signal receiver, a circuit coupled with the receiver to measure the signal strength of signals received thereby and produce an output representative of received signal strength and a controller responsive to the circuit output to cause the transmitter to transmit a signal representative of the strength of the signal received by the receiver and to provide each radio with a receive mode and a transmit mode such that the receiver and the transmitter of each radio do not operate simultaneously. The security system includes a base station/user positioned to receive the transmitted signal from one of the radio units and providing an indication of intrusion into the monitored area. The radio units are positioned such that each radio unit is within communication range of at least one other radio units, and the radio units can be capable of frequency hopping.

In a further aspect, the present invention uses a network of radio units to detect physical intrusions into a monitored area and report detected intrusions wherein transmissions between the radio units, which are affected by intruders, are also used to transfer detection notification to a base station.

In another aspect, the present invention utilizes half-duplex radio units arranged in a network where each radio unit is within communication range of at least one other radio unit with the radios using digital modulation of a carrier frequency to encode data with one of the radio units connected by wireless link or by wire, to a base station such as a computer or a PDA, referred to herein in some cases as a user, which displays the status of the perimeter security system.

In a further aspect, the present invention provides a perimeter security system for detecting physical intrusion in a monitored area utilizing a network of radio units which transmit signals periodically or, at other times, are either in a receiving mode or a sleeping mode. The transmissions occur according to a preset schedule established in a manner to prevent a receiver in a radio unit from simultaneously receiving signals from more than one transmitter. The transmitted signals are packet-based with each packet carrying the ID of the transmitter, the ID of the intended receiver(s), a CRC bit, payload and end-of-packets bits.

The security system of the present invention can monitor physical intrusions into an area, either indoors or outdoors, by human or other intruders and report the intrusion and its nature to a user. Some of the uses for the security system of the present invention, due to its flexible and adaptable nature, include perimeter sensing for detecting humans crossing a particular perimeter, bread crumbs functioning, retracing the path of a human such as in a cave, secure transportation of containers and cartons, detecting human movement behind a wall, detecting humans caught in rubble, alarm systems for animals, such as pets, tripwire fencing for military applications, swimming pool safety, work site safety, work site theft prevention, traffic monitoring, and detection of illegal border (perimeter) crossing.

Inasmuch as the present invention is subject to many variations, modifications and changes in detail, it is intended that all subject matter discussed above or shown in the accompanying drawings be interpreted as illustrative only and not be taken in a limiting sense.

BRIEF DESCRIPTION OF THE DRAWINGS

FIGS. 1 and 2 are schematic diagrams of the security system of the present invention using a triangular arrangement of radio units.

FIG. 3 is a block diagram of the security system of the present invention establishing a linear link between a transmitter and a base station.

FIGS. 4 and 5 are block diagrams of radio units for use with the security system of the present invention.

DESCRIPTION OF THE PREFERRED EMBODIMENTS

Figure 6:
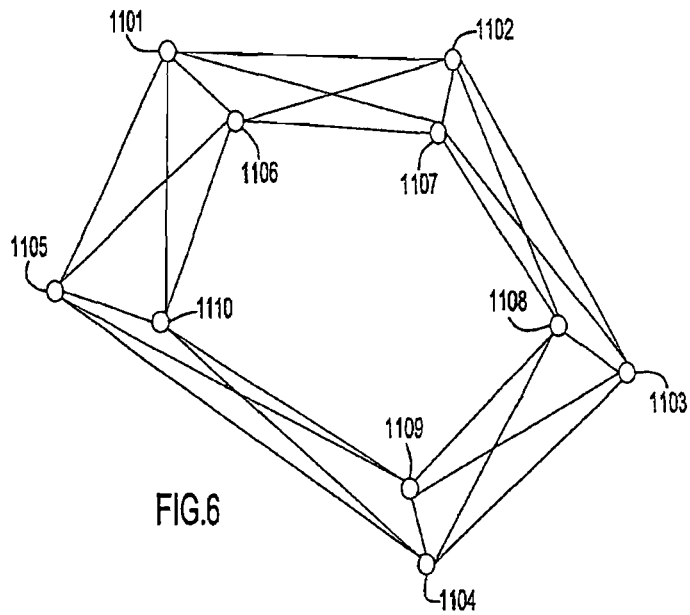
FIG. 6 is a schematic representation of a multiple perimeter security system according to the present invention.

An exemplary embodiment of the present invention is shown in FIGS. 1 and 2 with FIG. 1 illustrating a simple relaying network 10 of radio units 12 disposed at nodes in a triangular arrangement as illustrated in FIG. 2 to form the "backbone" for relaying information while acting as sensors arranged to form a perimeter for a monitored area 14. The radio units 12 shown in FIG. 1 are essentially arranged in triangular relationships as shown in FIG. 2 where the radio units of a triangle are illustrated as 12a, 12b and 12c. As shown simplistically in FIG. 3, a simple perimeter, as opposed to the triangular arrangement shown in FIGS. 1 and 2, is formed of a transmitter Tx, relay links or nodes RT and a receiver base Rx such as a PDA or computer. An intrusion, such as a human crossing in the line of sight between the relay links and the receiver base would be detected and sent to a monitoring or base station. The security system includes a network of narrow band radio units interfaced to produce the transmitter radio (TX) the relay nodes (RT), the receiver (RX) and a base unit coupled with a radio unit.

Each of the radio units 12 or RT is formed of a transmitter, a receiver, a received signal strength indicator (RSSI), a microcontroller, an analog-to-digital converter (ADC) and a memory. As previously noted, the radio units are half-duplex, i.e. each radio unit can transmit and receive but not transmit and receive simultaneously. When receiving an analog signal is generated to indicate the strength of the signal received by the receiver in each radio (RSSI), and the RSSI signal is converted to a digital signal and forwarded to the microcontroller for storage in the memory. The radio units include narrow-band, low-data rate, low power ($\approx$10 mW) radios operating in the frequency range between 800 MHz and several GHz. Each radio is half-duplex and, preferably, is capable of frequency hopping. The radio units use digital modulation of the carrier frequency to encode data and frequency shift keying in some cases. One of the radio units is connected by a wireless link, or by wire, to the base station, i.e. computer/PDA/user. The computer/PDA displays the status of the security system to an individual user. The same packet transmission that is used to detect intruders is also used to transfer detection notification and network status and control around the network and to the user.

The signals sent by the radio units are packet-based with a first part indicating whether the signal should be received and checking security (counting zeros or ones) such that only accepted packets are received thereby eliminating interference. Corrupted signals are dropped; and, therefore, the security system can operate in unregulated bands. The radio units operate with very low bits per second such that communications take a long time reducing bit error and corruption while causing increased signal stress.

Operation of two of the radio units 12 will be explained with respect to FIGS. 4 and 5 which show identical radio units 1400 and 1400-2, respectively, having components as described above. When transmitter 1410 of radio unit 1400 is in the transmit mode, a narrow band signal, which may be frequency hopped, is transmitted from radio unit 1400 and is received by radio unit 1400-2 which is in the receive mode. Receiver 1420-2 receives the signal transmitted from radio unit 1400, and an RSSI signal indicative of received signal strength is generated at 1430-2, converted to a digital signal by ADC 1450-2 and is supplied to the microcontroller 1440-2 which executes an intrusion detection function and provides radio unit control algorithms which are read from memory 1460-2. The intruder detection algorithms are based on RSSI levels, and a criterion for detection of an intruder is based on the received signal being significantly above or significantly below a nominal threshold established by the memory. Sudden changes that affect all radios simultaneously, such as a sudden rainstorm, are not misinterpreted as an intruder because no intruder would affect all radios simultaneously.

When an intruder is detected, the corresponding information is added to the next set of packets (signals) transmitted by radio unit 1400-2 to be received by a neighboring radio unit which will be in the receive mode. The receiving units will add the detection information to their outgoing packets (signals) such that the information will reach the user or base via the network of radio units. An advantageous feature of the security system of the present invention is that the same transmissions that are used to detect intruders are also used to transmit the detection and node status data to the user or base.

Figure 7:
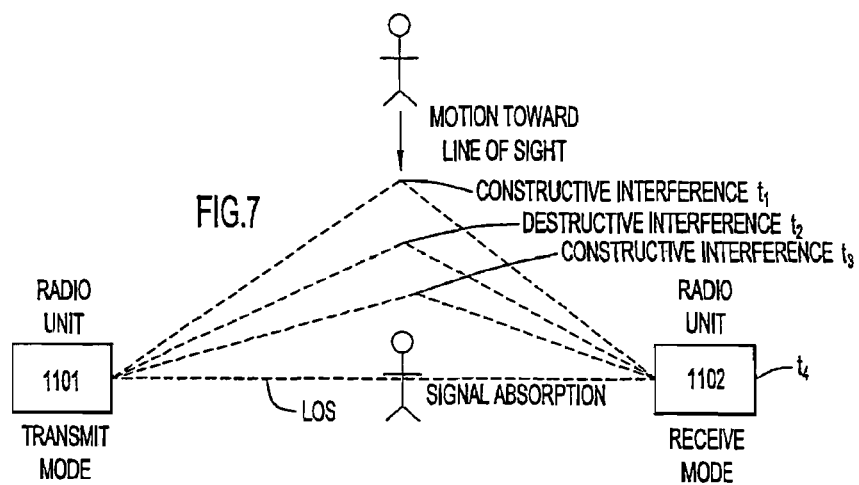
FIGS. 7 and 8 are representative of operation of the security system of the present invention relative to intrusion detection.
Figure 8:
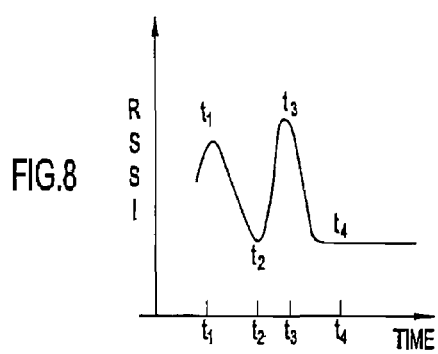

A modification of the present invention is shown in FIG. 6 wherein radio units are arranged in a more complex geometry such that multiple radio units receive each transmitted signal/packet. Radio units 1101, 1102, 1103, 1104 and 1105 form an outer ring around the area to be monitored, and an inner ring is formed of radio units 1106, 1107, 1108, 1109 and 1110, the inner ring providing additional security. The sequence of radio units 1101-1105 transmitting can be in the manner described above, that is in numerical sequence, but each transmission is detected by five other radio units. For example, the signal transmitted by radio unit 1101 is received by at least radio units 1105, 1102, 1110, 1106 and 1107. If the signals received at any of these radio units are indicative of detection of an intruder, the radio unit temporarily stores that information until that radio unit is placed in transmit mode. After radio units 1101-1105 transmit, radio units 1106-1110 transmit again in sequence. If any of these radio units had detected an intruder in the previous cycle, that information is added to their transmitted signals/packets, and radio units 1101-1105 will forward this information sequentially to the user. During the transmitting mode of radio units 1106-1110, each transmission is detected by at least five radio units. For example, the signal transmitted by radio unit 1106 will be detected by radio units 1101, 1102, 1107, 1110 and 1105, and each of these radio units is thus able to detect intruders. The multiple rings add robustness to the system and prevent false alarms through redundancy. For most paths, any intruder must affect eight direction sensitive paths traversing from outside to inside the monitored area. If a single transmission time from a radio unit is ten milliseconds, all ten transmissions will occur at ten transmissions per second from each radio unit. With reference to FIGS. 7 and 8, it will be noted that intruders near the line of sight of any link between radio units will affect the strength of the signals therebetween as indicated by the RSSI. If the intruder is on the line of sight (LOS), the received signal is weaker due to absorption. If the intruder is close to the line of sight, the signal strength increases due to constructive interference between the line of sight signal and the signal that is reflected from the intruder. For larger distances from the line of sight, the received signal strength may become stronger or weaker, depending on the phase shift between the line of sight signal and the signal reflected from the intruder. These fluctuations in signal strength are measured by the RSSI in the receiving radio unit, converted to a digital signal and processed by the receiver's microcontroller. In the example shown in FIG. 7, an intruder represented as motion orthogonal to the line of sight between radio units 1101 and 1102 and in the center between the radio units, it being noted that other geometries will generate similar results. The radio unit in transmit mode is radio unit 1101, and the radio unit in receive mode is radio unit 1102. Four positions are shown labeled $t_1$ through $t_4$ indicating the times at which the intruder passes each point. An intruder will be detected by either an increase or a decrease in the received signal strength as compared with the normal signal strength as shown in FIG. 8 with the normal signal strength level being adjusted at a slow rate to accommodate for environmental changes.

Figure 9:
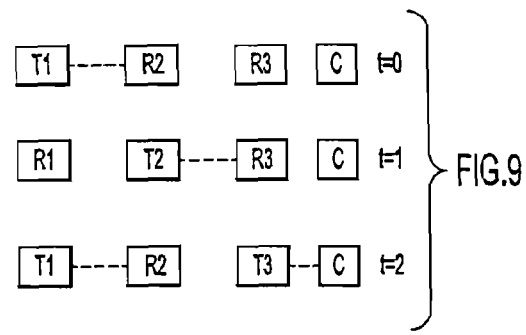
FIG. 9 is a block diagram illustrating an example of the manner in which radio units of the security system of the present invention can be controlled.

In operation, after the radio units are arranged around the area to be monitored and turned on, each radio unit transmits periodically. At other times, the radio units are either in receiving or sleeping mode. The transmissions occur according to a schedule as shown in FIG. 9, the schedule being established in a manner such that collisions due to two or more transmitters affecting a receiver simultaneously are minimized. The schedule can be established before the radio units are deployed or may be established after deployment during an automatic setup period.

FIG. 9 illustrates an example of radio units transmitting according to a schedule that avoids two transmitters simultaneously transmitting within communication range of the same receiver. T1, T2 and T3 indicate radio units that are transmitting, and R1, R2 and R3 indicate radio units that are receiving. C indicates the computer or PDA (base) for monitoring the security system, and T=0, 1, 2 indicates time steps. The communications between radio units is packet-based with each packet carrying the 10 (identification) of the transmitter, the ID of the intended receiver, CRC bit, payload and end-of-packet bits. When a receiver receives a packet intended for that receiver, the RSSI measures the signal strength.

Figure 10:
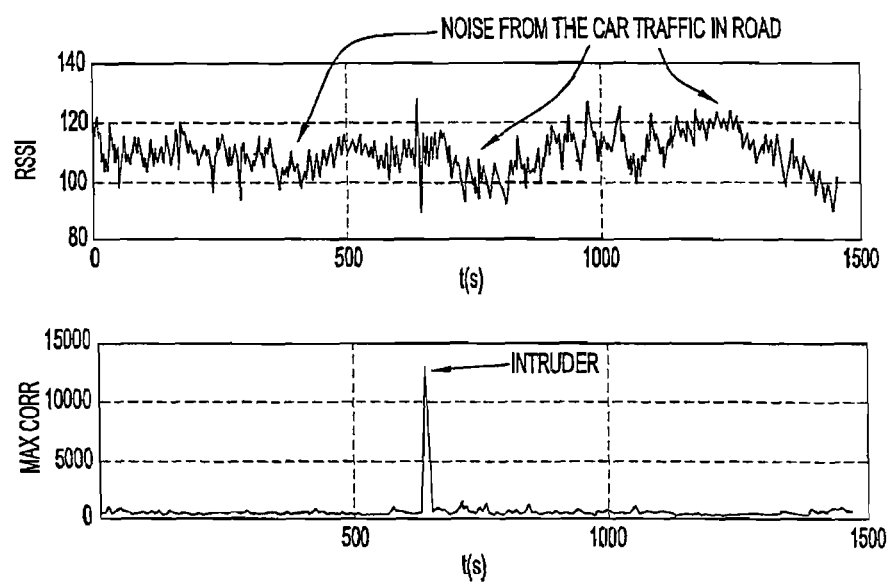
FIG. 10 includes graphs showing signal strength versus time.

After the radio units of the security system are initially deployed, or established in a network, around an area to be monitored, the radio units measure RSSI values of many packets transmitted between all radio units that are within communication range with each other. The user ascertains that, during this initial setup period, no intruders are present in the area to be monitored. The measured RSSI values are processed by each radio unit individually, or relayed to a central processing node. Specifically, for each link between a pair of radio units, the mean, standard deviation and other characteristics of the RSSI values are computed. In one embodiment, a user-specified "probability of false alarm" (PFA) with the statistical parameters of RSSI values are used to compute thresholds for the RSSI values for each radio unit to detect an intruder. The upper graph in FIG. 10 illustrates raw signal strength data vs. time for a 70 ft link and illustrates noise from automobile traffic as well as an intruder crossing at t $t_{(s)}$=600 s. The bottom graph shows processed signal strength vs. time with the signal-to-noise ratio for the intruder detection at 600 s improved by more than 10 dB.

Figure 11:
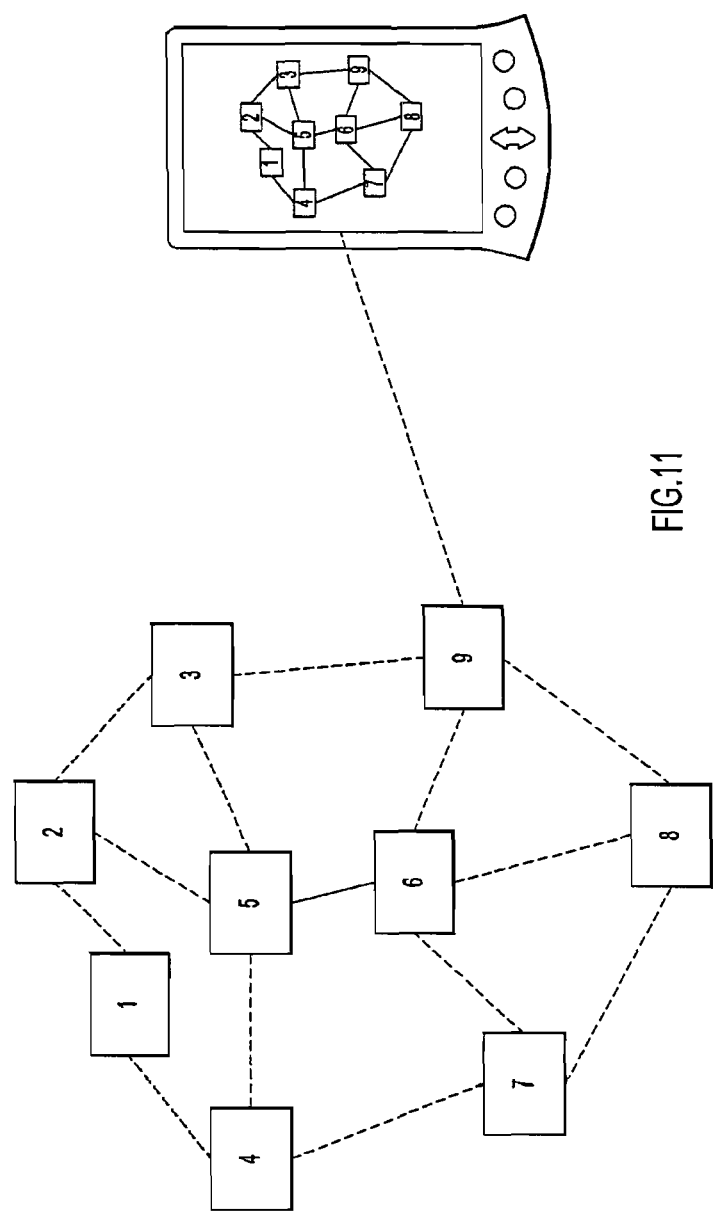
FIG. 11 is a schematic/block diagram representation of the security system of the present invention used with a PDA.

Once the thresholds are established, the RSSI value for each radio unit is evaluated against the threshold for that link. If the threshold is exceeded, a counter in the microcontroller of each radio unit is incremented. If the RSSI value does not exceed the threshold, the counter is decremented. If the counter reaches a predetermined value, a message containing the time, details of the RSSI value and a message that an intruder is detected is added to the payload of the packet transmitted by that radio unit. If the RSSI value at a particular radio unit does not exceed the threshold, a message is added to the next packet transmitted indicating that no intruder was detected and that the link was operational. Each radio unit passes on or relays the status of each link as indicated by the payload of the packets the radio unit receives, including the status of the links of which that radio unit is part. In this manner, messages containing the status of each link will periodically be received by all radio units in the network including the radio unit that communicates with the user. A graphical user interface (GUI) is provided at the user's computer/PDA indicating the status of each radio link, and the GUI can also indicate the location of each radio unit if the location of radio units is noted or recorded during placement. An example of a PDA with such a GUI is illustrated in FIG. 11 wherein the numbers, 1-8, on the GUI correspond with the radio units 1-8 deployed around an area to be monitored (not shown).

Transmitters external to the security system of the present invention that transmit using the same carrier frequency will cause the RSSI to fluctuate, as do intruders. However, since the data rate of the radio units is low, the modulation frequency of the carrier wave is low and, thus, each occurrence lasts many microseconds. For any intruders located within a few wavelengths from the line of sight, the path difference between the line of sight signal and the signal reflected from the intruder is at most a few periods of the carrier signal. That means that inter-symbol interference (overlapping of two symbols in time in a receiver) is negligible for a frequency above 100 megahertz and that signal strength fluctuations caused by the intruder will not cause bit errors. This represents a key difference between signal strength fluctuations due to intruders and signal strength fluctuations due to external transmitters. Transmitters external to the security system of the present invention that transmit the same carrier frequency will not be in phase with the radio unit transmitters. For sufficiently strong signals, the interference will cause bit errors in the packets sent by the radio units and cause a receiver to drop a packet. In this way, a strong external transmitter could jam the security system of the present invention. To reduce vulnerability to jamming, the transmitters and receivers of the radio units are capable of frequency hopping. Since each packet only lasts a few milliseconds, the radio units, transmitters and receivers can hop through a predetermined list of frequencies. If any particular frequency is jammed by external transmitters, the jamming will occur for only a few milliseconds.

Figure 12:
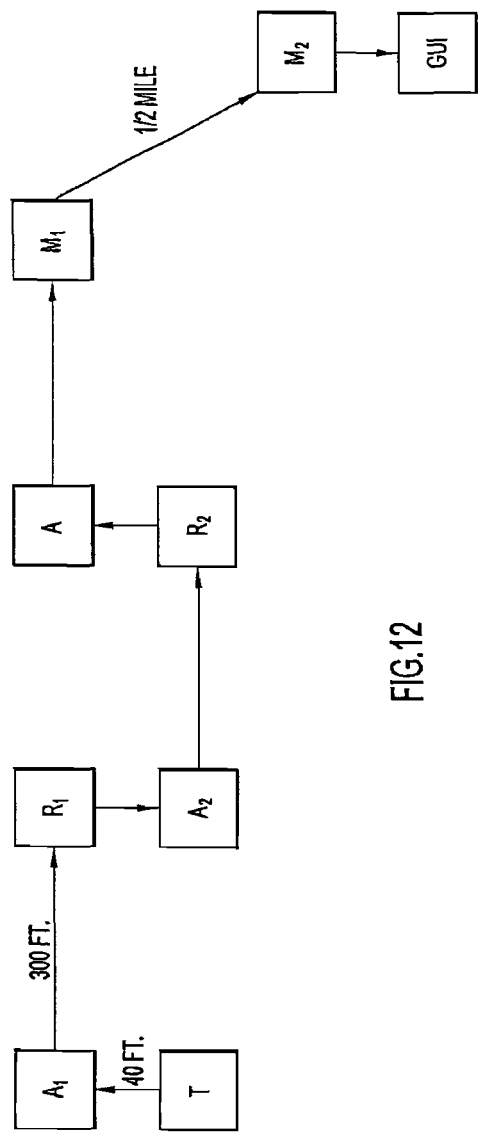
FIG. 12 is a block diagram of another embodiment of a perimeter formed by the security system of the present invention.

Another embodiment of the security system of the present invention is illustrated in FIG. 12 and includes radio units with amplifiers, denoted as A, and radio units without amplifiers denoted as R, the radio units being connected in series with alternating distances in between, for example, a 40 ft distance between a transmitter T and a first radio unit with amplifier A. In the embodiment shown, initially the security system will be set up using the radio units with amplifiers A and the radio units without amplifiers R as shown; and, after noting the location using a GPS system, the location of each of the radio units is provided to the base/GUI. The transmitter T is a radio with an amplifier but configured to operate only as a transmitter to transmit a data packet to the first radio unit with amplifier $A_1$ which receives the packet, measures the RSSI, analyzes the RSSI to determine the presence or lack of presence of an intruder near the T-$A_1$ link and sends a data packet to the first radio without amplifier $R_1$ with a message of "yes" or "no" (a 0 or a 1) indicating that there either is or is not an intruder in the segment of the system between $A_1$ and $R_1$. The next radio unit with amplifier in the security system $A_2$ detects the message from radio unit $R_1$ due to its close proximity to radio unit $R_1$. Radio unit $A_2$ then sends a data packet on to radio unit $R_2$ with a message indicating a 0 or a 1 for the segment between $A_1$ and $R_1$ and a 0 or a 1 indicating either that there is or there is not an intruder in the segment between $A_2$ and $R_2$. The data packet is sent through each radio unit with amplifier with each successive radio unit with amplifier transmitting data indicating the presence or absence of an intruder in the segment of the security system directly adjacent thereto and in the preceding segments or links of the security system. The last radio unit is connected to a modem $M_1$ which transmits all of the information to a second modem $M_2$ located a substantial distance from the first modem (indicated as ½ mile). The second modem $M_2$ is connected to a GUI/base at which a user can observe the system from a safe distance and report any detection of intruders. By utilizing triangular links as described above with respect to FIGS. 1 and 2, the security system of FIG. 12 can provide redundancy to compensate for any disruption of any of the radio units and will allow continuous operating of the security system in the event of a disruption in one link. An additional advantage of the use of the triangular pattern is to determine the direction of travel in addition to detecting the intrusion across a perimeter or perimeter link. Bidirectional amplifiers/receivers can be utilized to increase the distance between the radio units, and the GPS can be integrated into the security system such that location information does not need to be input manually into the GUI/base.

Figure 13:
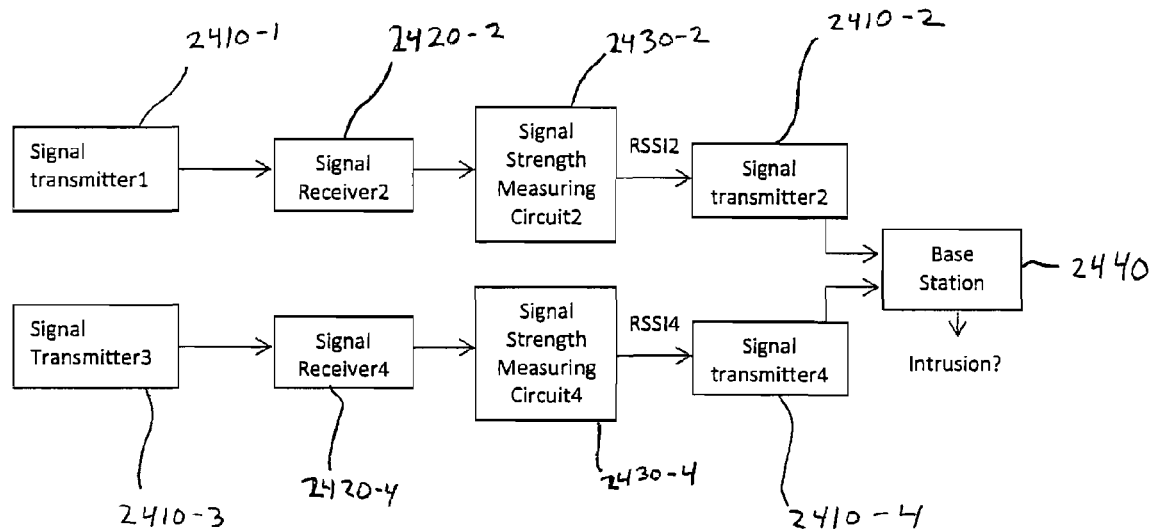
FIG. 13 is a block diagram of two circuits generating signals to a base station.

It is also contemplated that the detection can be based not on one or more RSSI readings measured by a signal strength measuring circuit, but on RSSI readings recorded during a short duration in multiple circuits connected to separate signal receivers within a communication range. An example of such a circuit is shown in FIG. 13 including signal transmitters 2410-1 and 2410-2; signal receiver 2420-2 and signal strength measuring circuit 2430-2 in one circuit and another circuit, which may be parallel, including signal transmitters 2410-3 and 2410-4; signal receiver 2420-4; and signal strength measuring circuit 2430-4 in a second circuit both transmitting to base station 2440 to determine whether an intrusion has occurred.

Figure 14:
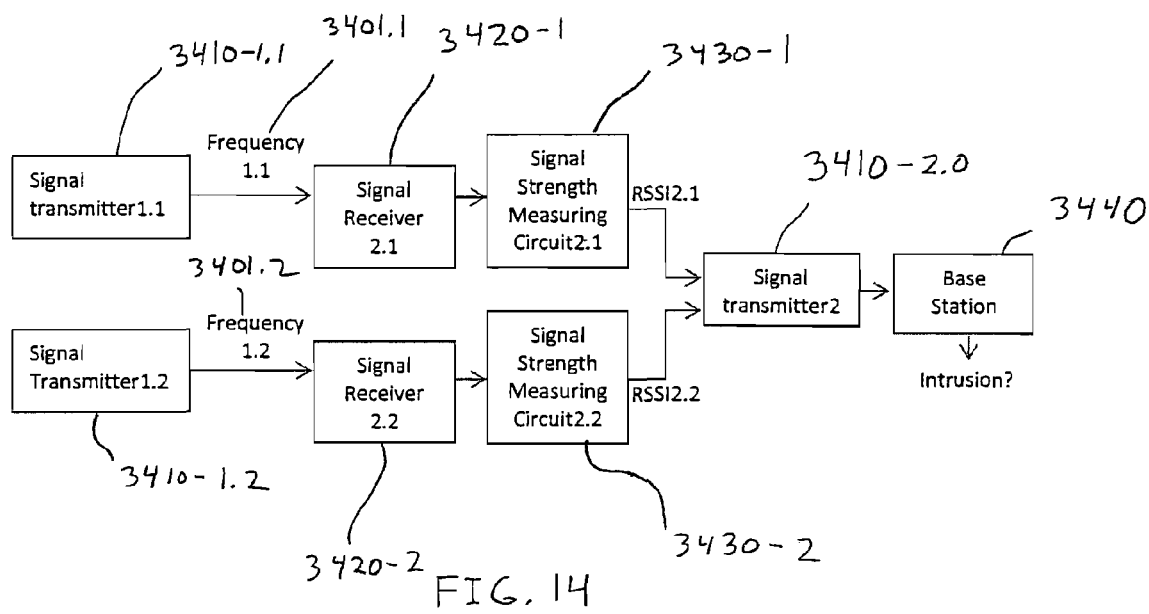
FIG. 14 is a block diagram showing two circuits simultaneously generating and receiving signals of different frequencies.

Referring now to FIG. 14, a diagram showing signals of multiple radio frequencies 3401.1 and 3410.2 being generated simultaneously from respective signal transmitters 3410-1.1 and 3410-1.2. Simultaneous generation of frequencies can be distinguished from frequency hopping, wherein the different frequencies are transmitted one at a time. Accordingly, the noise on RSSI2.1 reading in signal strength measuring circuit 3430-1 for transmitted frequency 3401.1, which is received by signal receiver 3420-1 is uncorrelated with the noise on RSSI2.2 reading from signal strength measuring circuit 3430-2 for frequency 3410-1.2 transmitted by 3410.2 and received by receiver 3420-2. RSSI2.1 and RSSI2.2 are transmitted through signal transmitter 3410-2.0 to base station 3440 to determine if there has been intrusion. Hence, by using multiple frequencies simultaneously at the same transmitter and receiver locations, lower probability of false alarms can be achieved by using a single carrier frequency. In addition, the use of multiple simultaneous frequencies allows the intrusion detection system to work under RF jamming conditions, or in situations where RF transmissions are restricted.

Inasmuch as the present invention is subject to many variations, modifications and changes in detail, it is intended that all subject matter discussed above or shown in the accompanying drawings be interpreted as illustrative only and not be taken in a limiting sense.

The invention claimed is:

1. A security system providing dual sensing of an intrusion, whereby a generating signal is generated and digitized and the resulting signal strength or changes in resulting signal strength is compared to an adjustable threshold, the system comprising:
a first circuit including a first signal transmitter, a first signal receiver, a signal strength measuring circuit for measuring resulting signal strength, and a second signal transmitter;
a second circuit including a third signal transmitter, a second signal receiver, a second signal strength measuring circuit for determining resulting signal strength, and a fourth signal transmitter; and
a base station positioned to receive signals transmitted from said second and fourth transmitters and providing a comparison thereof to an adjustable threshold to provide an indication of intrusion past a perimeter into a monitored area, and a plurality of said first and second circuits being arranged in a network to form an inner ring and an outer ring around the monitored area.

2. The security system as set forth in claim 1, wherein said transmitted signals are frequency hopped.

3. The security system as set forth in claim 1, further including memory units coupled with each circuit for storing radio unit control algorithms for operating said transmitters.

4. The security system as set forth in claim 1, wherein each of said circuits establishes a nominal threshold for received signal strength that produces a signal representative of intrusion monitored area when the received signal strength exceeds said threshold.

5. The security system as set forth in claim 4, wherein the nominal threshold is adjusted continually to compensate for environmental changes.

6. The security system as set forth in claim 1, including one or more additional circuits, same as said first or second circuits, the circuits being arranged in one or more triangular patterns.

7. The security system as set forth in claim 1, wherein the same transmitted signals from said transmitters are used to detect intrusions and to transmit detection status to said base station.

8. A security system providing dual sensing of an intrusion, whereby a generating signal is generated and digitized and the resulting signal strength or changes in resulting signal strength is compared to an adjustable threshold, the system comprising:
a first circuit including a first signal transmitter, a first signal receiver, a signal strength measuring circuit for measuring resulting signal strength, and a second signal transmitter;
a second circuit including a third signal transmitter, a second signal receiver, a second signal strength measuring circuit for determining resulting signal strength, and a fourth signal transmitter; and
a base station positioned to receive signals transmitted from said second and fourth transmitters and providing a comparison thereof to provide an indication of intrusion into a monitored area, wherein a plurality of sets of said first and second circuits are arranged in a network to form an inner ring and an outer ring around the monitored area, so that each transmission is detected by at least one other receiver in each of said inner ring and outer ring.

9. A security system providing dual sensing of an intrusion, whereby a generating signal is generated and digitized and the resulting signal strength or changes in resulting signal strength is compared to an adjustable threshold, the system comprising:
a first circuit including a first signal transmitter generating a signal of a first frequency, a first signal receiver, a first signal strength measuring circuit for detecting the resulting signal strength;
a second circuit including a second signal transmitter generating a second frequency, different than said first frequency, a second signal receiver, and a second strength measuring circuit;
a third signal transmitter for transmitting the received signal from the first and second circuits; and a base station positioned to receive said transmitted signals to provide an indication of intrusion into the monitored area, wherein the first and second frequencies are generated and received simultaneously.

10. The security system as set forth in claim 9, further including memory units coupled with each circuit for storing radio unit control algorithms for operating said transmitters.

11. The security system as set forth in claim 9, including one or more circuits same as said first or second circuits, the circuits being arranged in one or more triangular patterns.

12. The security system as set forth in claim 9, including a plurality of sets of said first and second circuits arranged in a network to form an inner ring and an outer ring around the monitored area.

13. A security system providing dual sensing of an intrusion, whereby a generating signal is generated and digitized and the resulting signal strength or changes in resulting signal strength is compared to an adjustable threshold, the system comprising:
- a first circuit including a first signal transmitter generating a signal of a first frequency, a first signal receiver, a first signal strength measuring circuit for detecting the resulting signal strength;
- a second circuit including a second signal transmitter generating a second frequency, different than said first frequency, a second signal receiver, and a second strength measuring circuit;
- a third signal transmitter for transmitting the received signal from the first and second circuits; and
- a base station positioned to receive said transmitted signals to provide an indication of intrusion into the monitored area, wherein each of said circuits establishes a nominal threshold for received signal strength that produces a signal representative of intrusion of the monitored area when the received signal strength exceeds said threshold, and the nominal threshold is adjusted continually to compensate for environmental changes.

14. A security system providing dual sensing of an intrusion, whereby a generating signal is generated and digitized and the resulting signal strength or changes in resulting signal strength is compared to an adjustable threshold, the system comprising:
- a first circuit including a first signal transmitter generating a signal of a first frequency, a first signal receiver, a first signal strength measuring circuit for detecting the resulting signal strength;
- a second circuit including a second signal transmitter generating a second frequency, different than said first frequency, a second signal receiver, and a second strength measuring circuit;
- a third signal transmitter for transmitting the received signal from the first and second circuits; and
- a base station positioned to receive said transmitted signals to provide an indication of intrusion into the monitored area, wherein the same transmitted signals from said transmitters are used to detect intrusions and to transmit detection status to said base station.

15. The security system as set forth in claim 14, wherein said transmitted signals are packet-based and intrusion detection information is added to the packets transmitted such that intrusion detection information reaches said base station via a plurality of radio units.

* * * * *